(12) United States Patent
Song et al.

(10) Patent No.: US 9,112,657 B1
(45) Date of Patent: Aug. 18, 2015

(54) METHOD FOR EXTRACTING INTERFERENCE SIGNAL INFORMATION AND APPARATUS FOR THE SAME

(71) Applicant: Samsung Electronics Co., Ltd., Gyeonggi-do (KR)

(72) Inventors: Seong-Wook Song, Seoul (KR); Dong-Hyun Kim, Seoul (KR); Sung-Yoon Cho, Seoul (KR); Jong-Han Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/640,680

(22) Filed: Mar. 6, 2015

Related U.S. Application Data

(60) Provisional application No. 61/948,873, filed on Mar. 6, 2014.

(30) Foreign Application Priority Data

Oct. 1, 2014 (KR) ........................ 10-2014-0132612

(51) Int. Cl.
*H04B 1/10* (2006.01)
*H04L 1/00* (2006.01)
*H04B 7/04* (2006.01)
*H04B 15/00* (2006.01)

(52) U.S. Cl.
CPC ............ *H04L 1/0048* (2013.01); *H04B 7/0413* (2013.01); *H04B 15/00* (2013.01)

(58) Field of Classification Search
CPC ................... H04L 25/03038; H04L 27/2647; H04L 1/0618; H04L 1/06; H04L 1/0003; H04L 1/0071; H04L 5/0007; H04B 1/1036
See application file for complete search history.

(56) References Cited

U.S. PATENT DOCUMENTS

| | | | |
|---|---|---|---|
| 2005/0186933 A1* | 8/2005 | Trans ............................ | 455/296 |
| 2009/0073931 A1* | 3/2009 | Chen et al. .................... | 370/329 |
| 2009/0265601 A1* | 10/2009 | Mielczarek et al. .......... | 714/799 |
| 2013/0121168 A1 | 5/2013 | Luo et al. | |

* cited by examiner

*Primary Examiner* — Ted Wang
(74) *Attorney, Agent, or Firm* — The Farrell Law Firm, P.C.

(57) ABSTRACT

A method and apparatus are provided for extracting interference signal information. The method includes demodulating control channel signals received from serving and adjacent cells; decoding the control channel signals received from the serving cell to extract control information; decoding the control channel signals received from the adjacent cell; extracting, at each subframe, from the decoded control channel signals received from the adjacent cell, a terminal ID of the adjacent cell; accumulating the extracted terminal IDs; filtering only a control channel signal from among the control channel signals received from the adjacent cell corresponding to a terminal ID having an accumulation count that is greater than or equal to a threshold; determining a reliability value of the filtered control channel signal; identifying the filtered control channel signal as a first interference signal, based on the reliability value; and extracting interference signal information based on the first interference signal.

10 Claims, 7 Drawing Sheets

METHOD FOR EXTRACTING INTERFERENCE SIGNAL INFORMATION AND APPARATUS FOR THE SAME

PRIORITY

This application claims priority under 35 U.S.C. §119(a) to U.S. Provisional Patent Application Ser. No. 61/948,873, which was filed on Mar. 6, 2014, and Korean Patent Application No. 10-2014-0132612, which was filed on Oct. 1, 2014, the content of each of which is hereby incorporated.

BACKGROUND

1. Field of the Disclosure

The present disclosure relates generally to a method and apparatus for extracting interference signal information without additional signaling from a network in a communication system.

2. Description of Related Art

Generally, in a cellular-based communication system, a terminal (e.g., a User Equipment (UE), a Mobile Station (MS), etc.) may suffer from interference caused by a signal from another terminal that uses the same resources in the same cell, and/or from another terminal in an adjacent cell. In this case, the terminal may detect or remove the interference signal from the signal that the terminal should receive, using an interference detection technique such as joint detection, thereby improving its signal reception performance.

However, if the terminal demodulates and decodes only the target signal without information about the interference signal, performance degradation caused by the interference signal may increase, and this phenomenon may be more severe at the terminal in the boundary of the cell. To combat this, the terminal may obtain control channel information for the interference signal, and use it for demodulation and decoding. In this case, however, the terminal should separately receive information about the interference signal from a base station (e.g., an evolved Node B (eNB), etc.) or should perform blind detection. Using blind detection, the terminal may reduce false alarms or misdetection probability with filtering techniques, but it is difficult to make correct filtering determinations, thereby limiting performance improvement of the interference cancellation function.

Generally, when terminals attach to or connect to a base station, the base station allocates a unique ID to each of the terminals (hereinafter, referred to as a UE-ID). However, each terminal may not know a UE-ID of another terminal since the terminal receives only its own UE-ID through upper-level signaling. In the 3GPP LTE system, the UE-ID is called an RNTI.

Figure 1:
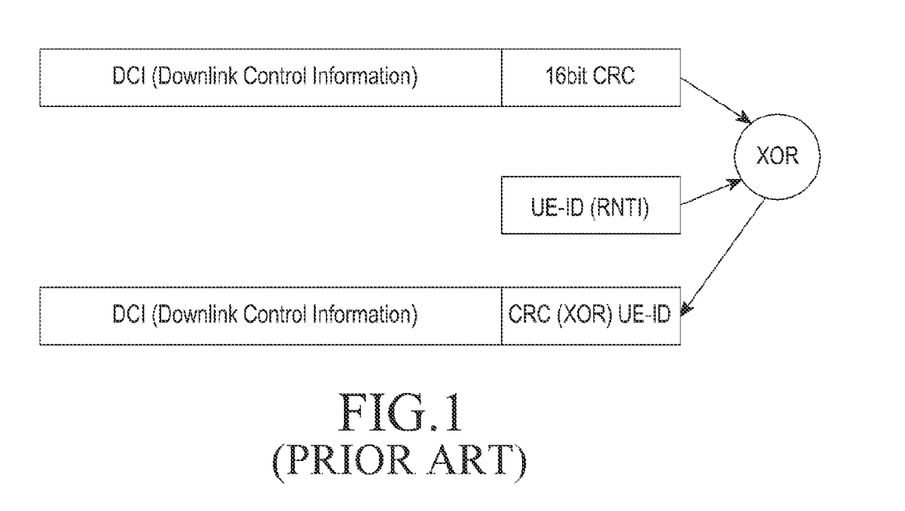
FIG. 1 illustrates an application of a UE-ID to a control channel in a conventional LTE system.

FIG. 1 illustrates an application of a UE-ID to a control channel in a conventional LTE system.

Referring to FIG. 1, a base station generates DCI, and then attaches a 16-bit Cyclic Redundancy Check (CRC) to the DCI, for error detection at a terminal. That is, to distinguish a DCI of each terminal, the base station may mask a 16-bit CRC with a UE-ID through an Exclusive OR (XOR) operation, and then transmit the masking results over a control channel (e.g., a Physical Downlink Control Channel (PDCCH)).

A terminal may receive a control channel in every subframe, and then find its own DCI through a blind decoding process in which a terminal attempts decoding for all wireless resource units that are available for each terminal in a control channel. For the decoded control channel signals, the terminal determines whether a DCI in the decoded control channel signals is its own DCI, using its unique UE-ID.

Figure 2:
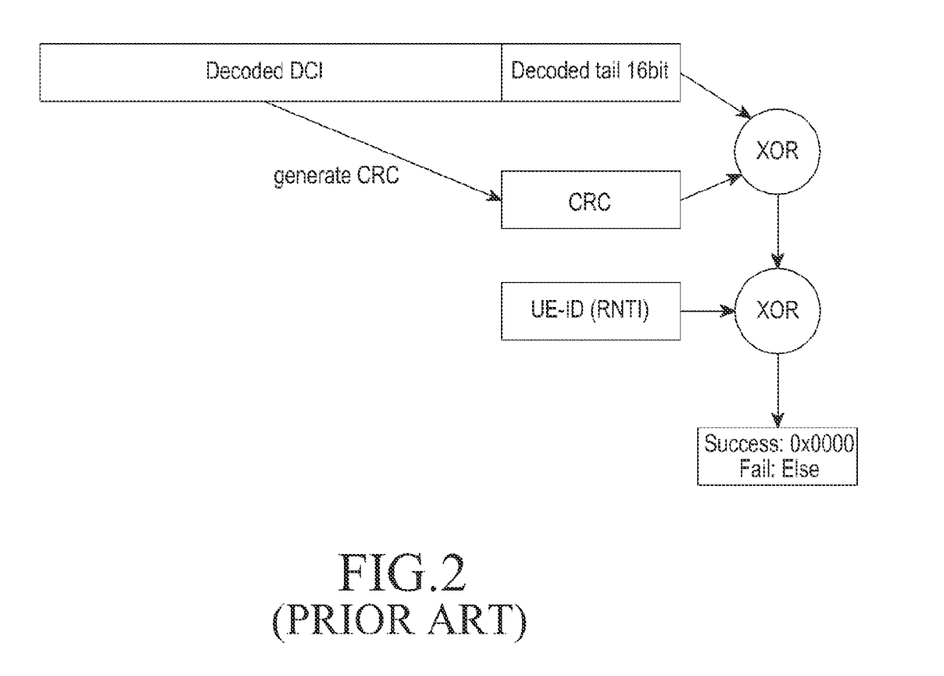
FIG. 2 illustrates a conventional method of a terminal receiving a control channel signal.

FIG. 2 illustrates a conventional method of a terminal receiving a control channel signal.

Referring to FIG. 2, the terminal decodes a received DCI, and then generates a CRC with information bits, excluding 16 tail bits corresponding to a CRC. If the decoded DCI matches a DCI of the terminal, a UE-ID of the terminal may be derived when the XOR operation is performed on the decoded tail bits and the CRC generated by the terminal.

Therefore, if the UE-ID derived through the XOR operation matches the UE-ID of the terminal (i.e., Success), the terminal may demodulate and decode received data using the DCI information, determining that the decoded DCI is its own DCI. However, if the UE-ID derived through the XOR operation is different from the UE-ID of the terminal (i.e., Fail), the terminal may discard the DCI, determining that the decoded DCI is a DCI of another terminal.

Figure 3:
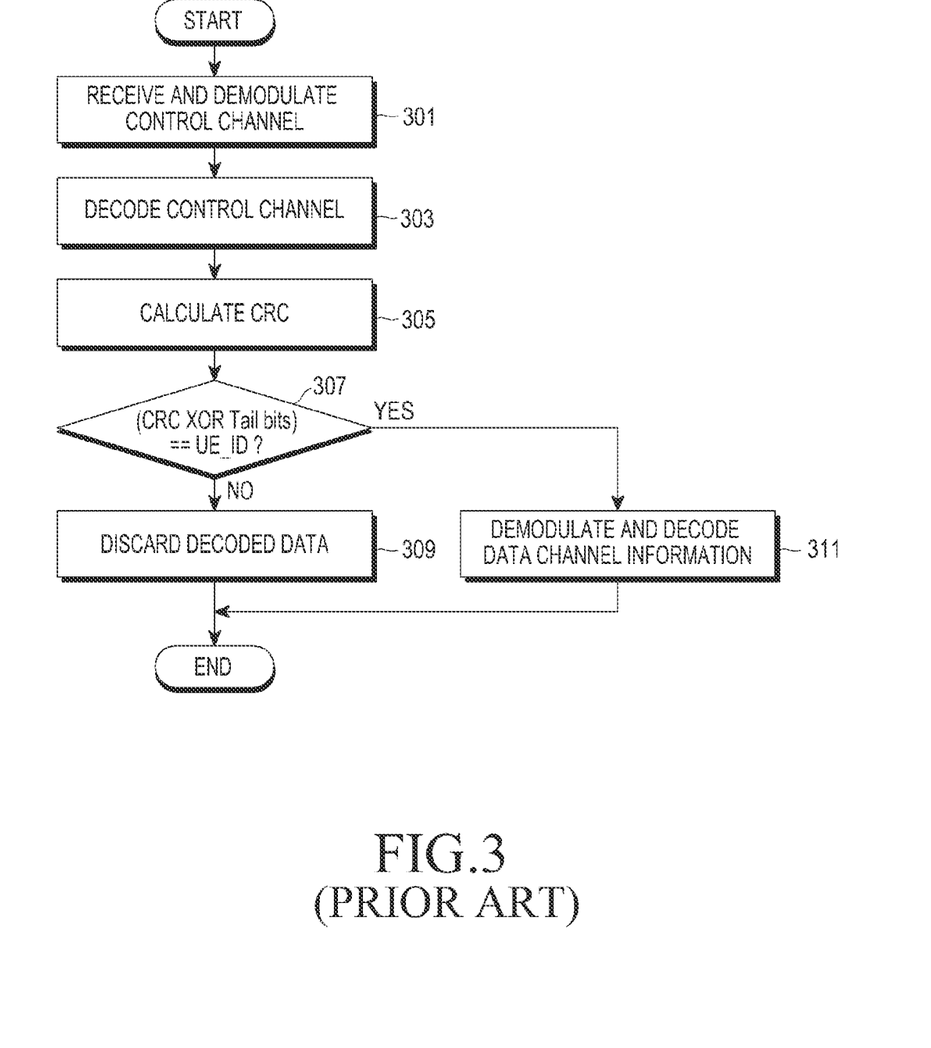
FIG. 3 is a flowchart illustrating a conventional control channel decoding process in a terminal.

FIG. 3 is a flowchart illustrating a conventional control channel decoding process in a terminal.

Referring to FIG. 3, a terminal receives and demodulates a control channel in step 301. In step 303, the terminal decodes the demodulated control channel. In step 305, the terminal calculates a CRC using information bits of the decoded control channel. In step 307, the terminal determines whether a value determined, i.e., a determined UE-ID, by performing the XOR operation on the decoded tail bits and the calculated CRC matches its own UE-ID previously received from the base station. If the determined value is the same as the terminal's own UE-ID, the terminal demodulates and decodes information of a data channel using the DCI, determining that the decoded data is its own DCI, in step 311. However, if it is determined in step 307 that the determined value is not the same as its own UE-ID, the terminal discards data of the decoded control channel, determining that the decoded data is a DCI for another terminal, in step 309.

After obtaining DCI information, the terminal may receive downlink data from a base station in a cell to which the terminal belongs. However, if there is a terminal that uses the same frequency-time resources in the same cell as that of the terminal, or if a base station of another cell is transmitting data to another terminal using the same frequency-time resources, the terminal may experience performance degradation due to the interference problems, when receiving data. Although various methods have been proposed to solve the interference problems in a terminal, the actual performance improvement is limited if the terminal does not have information as to whether a signal is an interference signal.

For example, if a terminal has correct information about an interference signal, the terminal may improve the reception performance using a method of joint-detecting the signal the terminal should receive, and the interference signal. However, because a terminal generally does not know information about UE-IDs of other terminals, the terminal may not extract a DCI of another terminal, in which information about the interference signal is present, so the terminal may not use an improved algorithm such as joint detection.

Basically, in order for a terminal to know a UE-ID in an interference signal, the base station should provide information about the UE-ID through separate signaling, or the terminal should directly detect the UE-ID. However, if the base station does provide this information about the UE-ID in the interference signal, this will increase the overhead of the control channel. Accordingly, to address this issue, a blind decoding scheme has been proposed, in which a terminal attempts decoding for allocation of all possible control channels, and determines the validity of the control channel using a soft metric and the like.

In the existing LTE system, a blind decoding method for extracting a terminal's own control signal has limited the complexity by allowing the terminal to attempt to decode only 44 detection locations, by limiting the detection locations using its own RNTI that the terminal already knows. However, if the blind decoding scheme used for decoding a control channel of another terminal is applied, the terminal should perform decoding for all the detection locations of the full band and the DCI formats because the terminal does not know the RNTI of the other terminals, increasing the likelihood of RNTI false alarms.

Specifically, in the LTE system, DCI information of each terminal may be transmitted over a PDCCH including a plurality of Control Channel Elements (CCEs), and the PDCCH may be divided into four types of Aggregation Levels (ALs) and into a plurality of DCI formats depending on the number of CCEs allocated to the terminal. Therefore, if there are a total of, for example, 43 CCEs, there are a total of 79 PDCCH candidates (including 43 PDCCH candidates for AL=1, 21 PDCCH candidates for AL=2, 10 PDCCH candidates for AL=4, and 5 PDCCH candidates for AL=8). If 6 formats exist for each of the number of DCI cases, 474 candidates may be present in the DCI information that is finally allocated to one terminal.

Therefore, a terminal may blind-decode all possible PDCCH candidates to obtain a UE-ID and control channel information of another terminal, and may use a soft metric-based filtering or UE-ID based filtering method to decrease the false alarm probability of falsely estimating a UE-ID.

The soft metric-based filtering method may use reliability information of decoded data. If decoding is performed on all possible DCIs, information about decoded data may be provided from a decoder. The decoded data may be re-encoded to define a difference or correlation between the re-encoded data and input data as a reliability value, and the reliability values for all possible DCIs may be calculated in order to determine whether a PDCCH is valid for the DCIs having a high reliability value. That is, in a good wireless channel environment, if a DCI has valid information, a DCI value having a very high reliability value may be calculated through the decoding and re-encoding process. However, in the soft metric-based filtering scheme, even though a soft metric value is large, a false alarm other than a desired UE-ID value may be generated. In particular, if an AL is low, a false alarm is likely to occur.

The UE-ID based filtering method uses CCEs of a PDCCH determined by a UE-ID of a terminal. In the LTE system, for a PDCCH having information about each terminal, locations of CCEs may be determined by the UE-ID (i.e., RNTI) value of the terminal. If there are 43 available CCEs and AL is 1, 2, 4, or 8, a PDCCH may start at one of 6, 6, 2, or 2 CCE locations depending on the AL value, respectively. As a result, it is possible to determine whether the DCI and RNTI are valid information. For example, assuming that a CRC is calculated using the results obtained by decoding a PDCCH that has AL=1 and is located in CCE index=5, and a UE-ID value determined by performing the XOR operation on the CRC and the tail bits is represented by X, if CCE indexes which are possible with X are {7, 8, 9, 10, 11, 12}, the CCE index=5 of the decoded PDCCH may not be included in a set of CCE indexes possible with X. Thus, a UE-ID X=5 would be considered invalid, and the UE-ID and DCI information may be discarded. However, in the UE-ID based filtering scheme, multiple RNTI candidates still exist, even after undergoing filtering, so a possibility of the false alarm is high. For example, assuming that there are four types of ALs (AL=1, AL=2, AL=4, and AL=8), there are six types of DCI formats, and there are 43 available CCEs, then the total number of possible PDCCH candidates is 474. If the UE-ID based filtering is applied thereto, 96 PDCCH candidates may remain on average. If the soft metric-based filtering is additionally performed, 16 PDCCH candidates may remain on average. That is, even though both of the current two techniques are used, the false alarm possibility of falsely estimating a UE-ID is high.

SUMMARY

An aspect of the present disclosure is to address at least the above-mentioned problems and/or disadvantages and to provide at least the advantages described below.

Accordingly, an aspect of the present disclosure is to provide a method and apparatus for a terminal to directly extract interference signal information from an interference control channel by blind detection, without additional signaling from a base station.

Another aspect of the present disclosure is to provide a method and apparatus for increasing accuracy by using traffic characteristics when directly decoding a control channel of an interference signal to obtain information about the interference signal.

In accordance with an aspect of the present disclosure, a method is provided for extracting interference signal information by a terminal in a communication system. The method includes demodulating control channel signals received from a serving cell and an adjacent cell; decoding the control channel signals received from the serving cell to extract control information; decoding the control channel signals received from the adjacent cell; extracting, at each subframe, from the decoded control channel signals received from the adjacent cell, a terminal Identifier (ID) of the adjacent cell; accumulating the extracted terminal IDs; filtering only a control channel signal from among the control channel signals received from the adjacent cell corresponding to a terminal ID having an accumulation count that is greater than or equal to a threshold, from among the accumulated extracted terminal IDs; determining a reliability value of the filtered control channel signal; identifying the filtered control channel signal as a first interference signal, if the reliability value is greater than or equal to a first predetermined value; and extracting interference signal information based on the first interference signal.

In accordance with another aspect of the present disclosure, an apparatus is provided for extracting interference signal information in a communication system. The apparatus includes a receiver configured to demodulate control channel signals received from a serving cell and control channel signals received from an adjacent cell; and a control channel decoder configured to: decode the control channel signals received from the serving cell to extract control information; decode the control channel signals received from the adjacent cell; extract, at each subframe, from the decoded control channel signals received from the adjacent cell, a terminal Identifier (ID) of the adjacent cell; accumulate the extracted terminal IDs; filter only a control channel signal from among the control channel signals received from the adjacent cell corresponding to a terminal ID having an accumulation count that is greater than or equal to a threshold, from among the accumulated extracted terminal IDs; determine a reliability value of the filtered control channel signal; identify the filtered control channel signal as a first interference signal, if the reliability value is greater than or equal to a first predetermined value; and extract interference signal information based on the first interference signal.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to their dictionary meanings, but, are merely used to enable a clear and consistent understanding of the disclosure. Accordingly, it should be apparent to those skilled in the art that the following description of embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although various embodiments of the present disclosure will be described in detail below with reference to an LTE wireless access network, the standard of which is established by $3^{rd}$ Generation Partnership Project (3GPP), it will be apparent to those of ordinary skill in the art that the subject matter of the present disclosure may be applied to any other communication systems having the similar technical background with slight modifications, without departing from the spirit and scope of the present disclosure.

In accordance with an embodiment of the present disclosure, a method and apparatus are provided in which, for efficient processing of an interference signal from a wireless terminal, a terminal directly extracts interference signal information from an interference control channel, without additional signaling from a base station.

Figure 4:
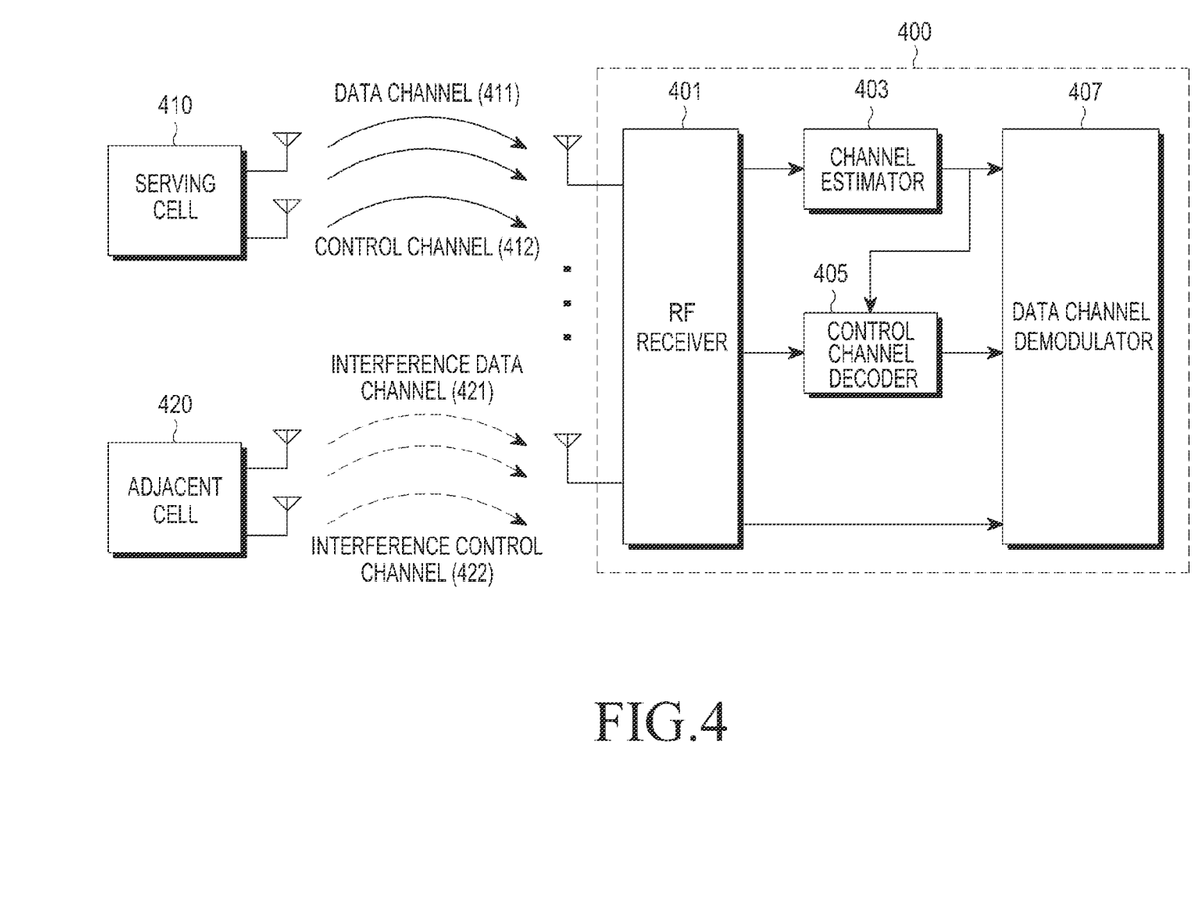
FIG. 4 illustrates a system configuration for extracting interference signal information according to an embodiment of the present disclosure.

FIG. 4 illustrates a system configuration for extracting interference signal information according to an embodiment of the present disclosure.

Referring to FIG. 4, a terminal 400 receives a data channel 411 and a control channel 412 transmitted from a base station 410 of a serving cell, and receives a data channel 421 and a control channel 422 transmitted from a base station 420 of an adjacent cell. The data channel 421 and the control channel 422 transmitted from the base station 420 of the adjacent cell act as interference signals. The signals received from the base stations 410 and 420 are provided to a channel estimator 403, a control channel decoder 405, and a data channel demodulator 407 through a Radio Frequency (RF) receiver 401. The channel estimator 403 estimates wireless channels and provides the estimation results to the control channel decoder 405 and the data channel demodulator 407. The control channel decoder 405 decodes the control channel 412 received from the base station 410 of the serving cell to obtain a DCI, and provides the DCI to the data channel demodulator 407. The data channel demodulator 407 demodulates the data channel 411 using the channel estimation results of the channel estimator 403 and the DCI provided from the control channel decoder 405, to obtain the data from the data channel 411.

The control channel decoder 405 decodes the control channel 412 received from the base station 410 of the serving cell, and then determines whether the received control channel 412 is a control channel signal for the terminal itself, through a CRC check. If the terminal operates in an MU-MIMO mode, the control channel decoder 405 performs decoding to find a control channel of another terminal that uses the same resources in the same serving cell. The control channel decoder 405 may also perform decoding to find a control channel of an interference signal transmitted from a base station of an adjacent cell. The control channel decoder 405 decodes control channels received from the base stations of the serving cell and the adjacent cell, in order to obtain reliability information, and then determines the validity of the interference signal using the obtained reliability information.

Figure 5:
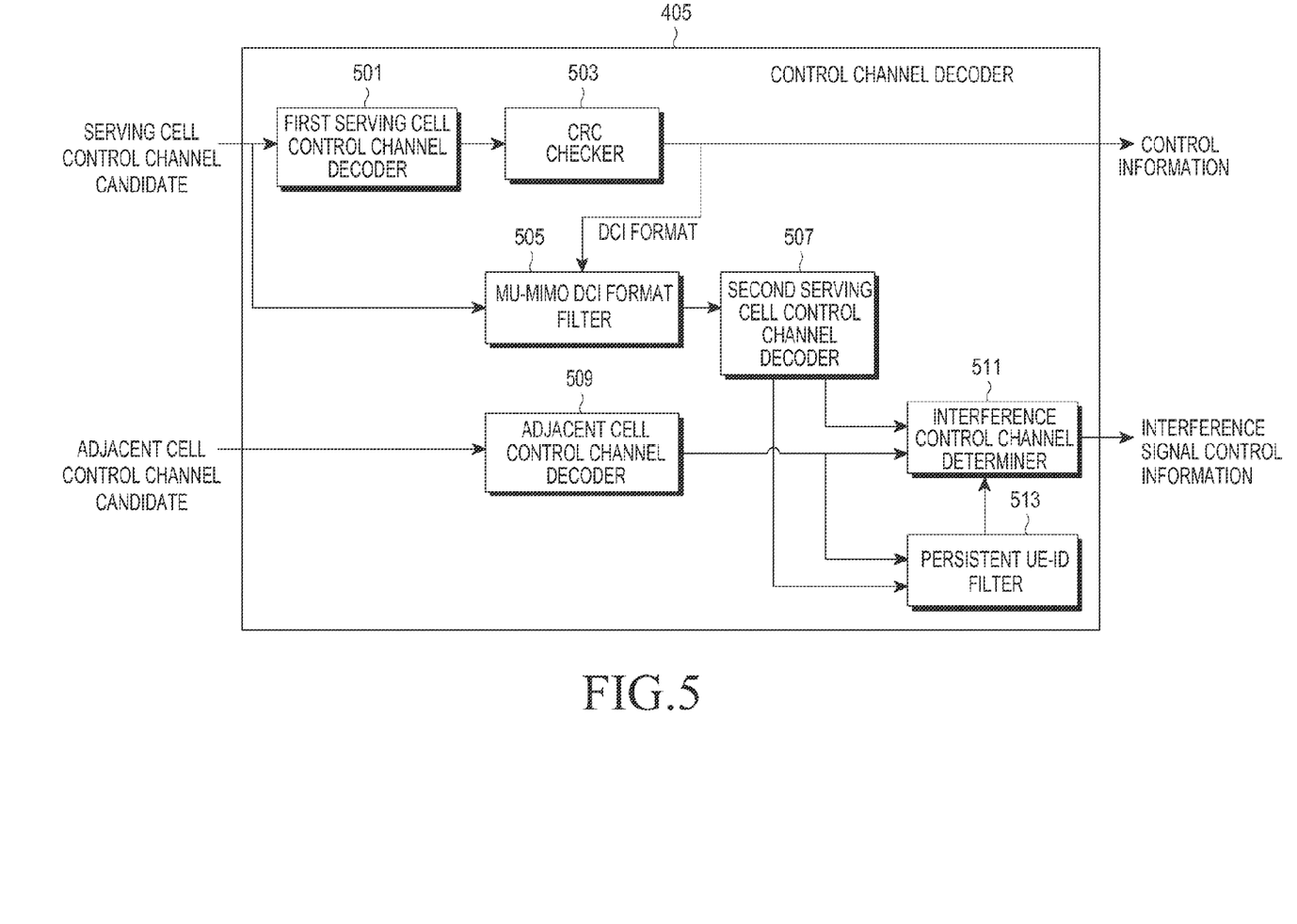
FIG. 5 illustrates a control channel decoder according to an embodiment of the present disclosure.

FIG. 5 illustrates a control channel decoder according to an embodiment of the present disclosure.

Referring to FIG. 5, the control channel decoder 405 includes a first serving cell control channel decoder 501, a CRC checker 503, an MU-MIMO DCI format filter 505, a second serving cell control channel decoder 507, an adjacent cell control channel decoder 509, an interference control channel determiner 511, and a persistent UE-ID filter 513.

The first serving cell control channel decoder 501 decodes the control channel received from the base station of the serving cell, and the CRC checker 503 performs a CRC check on the control channel decoded by the first serving cell control channel decoder 501. The adjacent cell control channel decoder 509 decodes the control channel received from the base station of the adjacent cell. The MU-MIMO DCI format filter 505, the second serving cell control channel decoder 507, the interference control channel determiner 511, and the persistent UE-ID filter 513 determine the validity of the interference signal of the decoded control channel according to an embodiment of the present disclosure.

According to different embodiments of the present disclosure, two techniques, 1.) Persistent UE-ID Filtering and 2.) MU-MIMO DCI Format Filtering, are provided to increase the accuracy of the validity check for an interference signal.

Persistent UE-ID Filtering

Generally, a UE-ID is allocated when a terminal accesses a base station to perform communication. The allocated UE-ID is often transmitted through an upper layer, and kept until the communication is terminated. Therefore, if a terminal persistently receives data for a predetermined time, the UE-ID may be kept at the same value. By using these characteristics, it is possible to accurately estimate the UE-ID. A persistent UE-ID filtering scheme according to an embodiment of the present disclosure may be used independently, or may be used together with a soft metric-based filtering scheme or an existing UE-ID based filtering scheme.

Figure 6:
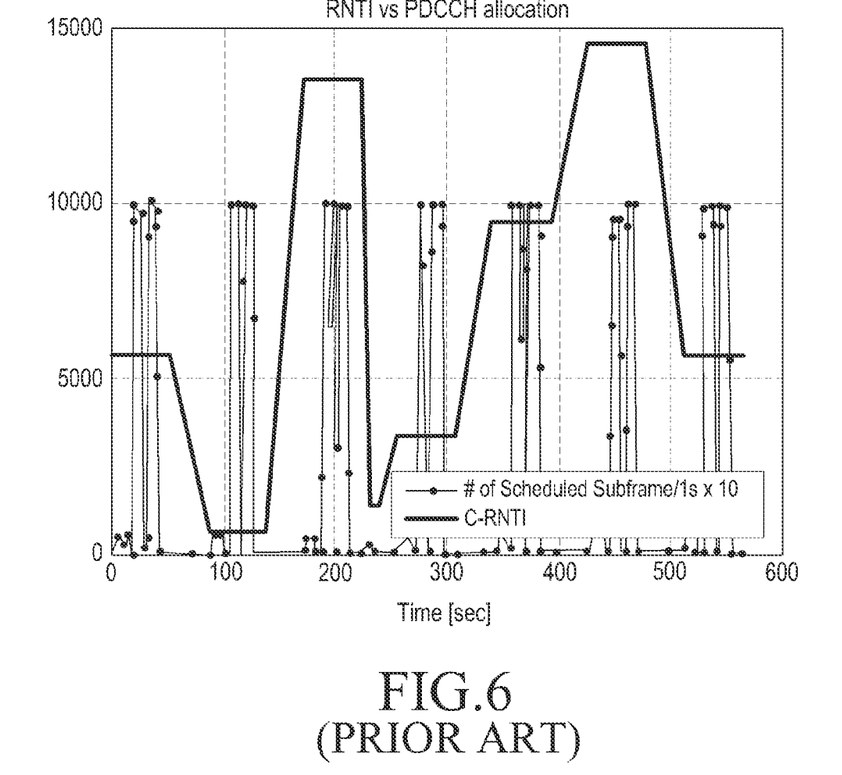
FIG. 6 illustrates an example of Radio Network Temporary Identity (RNTI) allocation in a conventional LTE communication network.

FIG. 6 illustrates an example of Radio Network Temporary Identity (RNTI) allocation in a conventional LTE communication network.

Referring to FIG. 6, if an RNTI is allocated to a terminal during the presence of traffic to be transmitted from the base station to the terminal, the same UE-ID is kept until the traffic is terminated.

Therefore, using these characteristics, the persistent UE-ID filtering unit 513 in the control channel decoder 405 according to an embodiment of the present disclosure may estimate a UE-ID of the interference signal.

Figure 7:
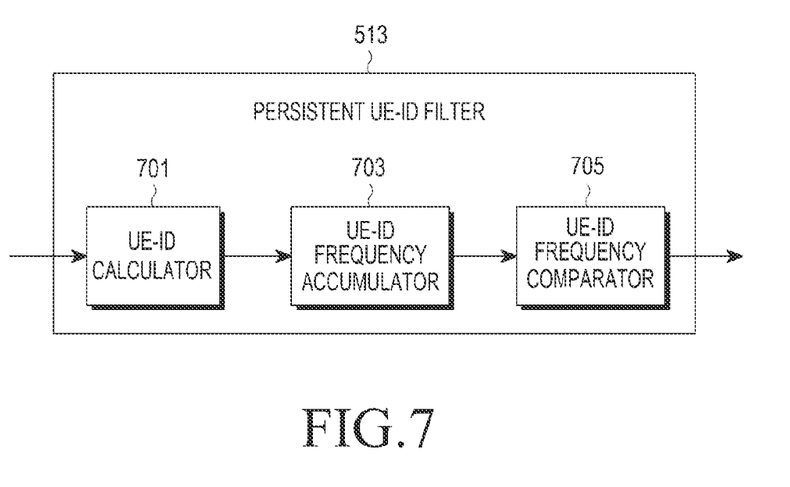
FIG. 7 illustrates a persistent UE-ID filtering unit according to an embodiment of the present disclosure.

FIG. 7 illustrates a persistent UE-ID filtering unit according to an embodiment of the present disclosure.

Referring to FIG. 7, the persistent UE-ID filter 513 includes a UE-ID calculator 701, a UE-ID frequency accumulator 703, and a UE-ID frequency comparator 705.

The UE-ID calculator 701 calculates a UE-ID by performing an XOR operation on tail bits obtained from results of decoding control channel candidates of a serving cell and adjacent cells, and a CRC calculated from the decoded data.

The UE-ID frequency accumulator 703 accumulates the frequency of each UE-ID that is calculated in every subframe, and the UE-ID frequency comparator 705 compares the accumulated frequency for each UE-ID with a predetermined threshold, determines a UE-ID whose accumulated frequency is greater than or equal to the threshold, as a valid UE-ID, and provides the determination results to the interference control channel determiner 511. By adjusting the buffer size of the UE-ID frequency accumulator 703 and the threshold of the UE-ID frequency comparator 705 to suit the system environment, for the accuracy of the UE-ID detection, it is possible to properly adjust the false alarm or detection missing probability.

After the demodulation of a control channel, if there is no error, a UE-ID may be obtained by performing the XOR operation on the CRC regenerated from the demodulated data and the tail bits. However, in the common case, an error may occur in the demodulation process. In this case, the regenerated CRC may be mismatched with the CRC that is applied to the transmitted signal, so the UE-ID detected through the XOR operation may have a meaningless random pattern. However, when there is a terminal that accesses the base station to perform communication according to an embodiment of the present disclosure, if a UE-ID is continuously extracted over several subframes, even though an error occurs in the decoding process, the number of observations for a fixed UE-ID still higher than the random pattern that is determined by calculating a UE-ID only in one subframe.

Figure 8:
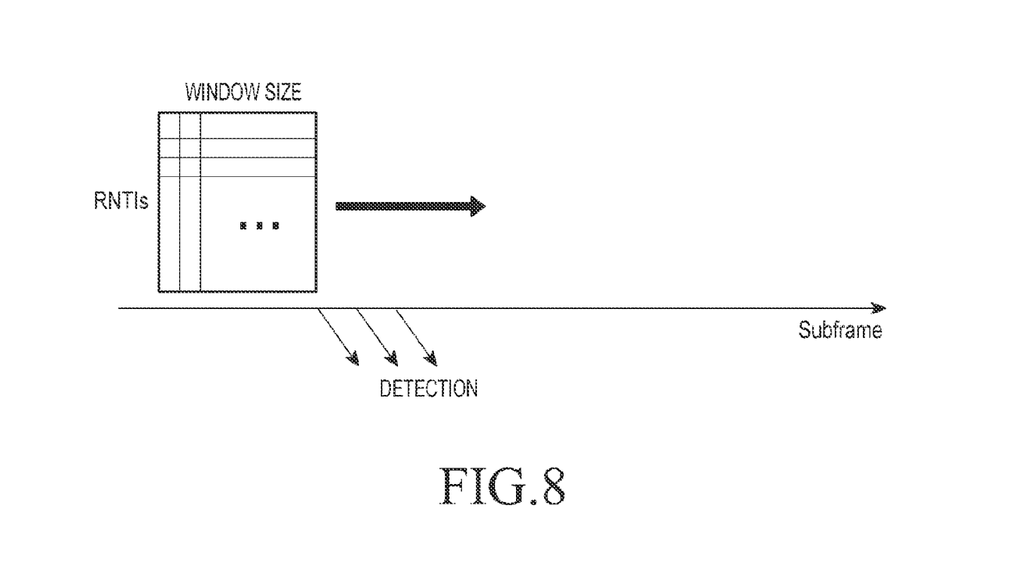
FIG. 8 illustrates frequency accumulation for each UE-ID according to an embodiment of the present disclosure.

FIG. 8 illustrates frequency accumulation for each UE-ID according to an embodiment of the present disclosure.

Referring to FIG. 8, the UE-ID calculator 701 calculates a UE-ID of control channel candidates in every subframe, and the UE-ID frequency accumulator 703 stores, in its buffer, the frequency for each UE-ID during the recent several subframes corresponding to the buffer size. The UE-ID frequency comparator 705 compares the frequency of each UE-ID with a predetermined threshold, and if the frequency of each UE-ID is greater than the threshold, the UE-ID frequency comparator 705 provides the UE-ID to the interference control channel determiner 511, determining that the UE-ID is valid. Thereafter, the interference control channel determiner 511 determines whether the control channel is valid as an interference signal, using the reliability information of the data decoded from the control channel having the UE-ID.

MU-MIMO DCI Format Filtering

If a terminal operates in an MU-MIMO transmission mode, the number of decoding operations may be significantly reduced by reducing the number of candidates for the DCI format that the terminal can use. In the MU-MIMO transmission mode, the terminals that receive signals using the same time-frequency resources in the same serving cell may all operate in the same transmission mode, and the signals that use the same DCI format and are transmitted to another terminal may operate as interference signals to the terminal. Therefore, if a terminal knows the DCI format used by its own PDCCH and operates in the MU-MIMO transmission mode, the terminal knows that another terminal that uses the same resources in the same serving cell may also use the same DCI format.

Table 1 illustrates a relationship between DCI format sizes and transmission modes used in MU-MIMO in the LTE communication system.

TABLE 1

| DCI format size<br>[10 MHz] | DCI<br>format | Transmission<br>mode |
|---|---|---|
| 59 | 2B | TM8 |
| 61 | 2C | TM9 |

If MU-MIMO DCI format filtering according to an embodiment of the present disclosure is applied, a terminal may perform decoding on only the control channel candidates having the same DCI format as its own DCI format, without having to decode the control channel candidates having other DCI formats, thereby reducing the number of decoding operations, compared with performing decoding using multiple DCI formats. For example, if a terminal operates in a dual-layer transmission mode, the terminal does not need to perform blind decoding for the DCI format corresponding to a single-layer transmission mode or a multi-layer transmission mode.

Specifically, if the terminal operates in the MU-MIMO transmission mode, the MU-MIMO DCI format filter 505, as illustrated in FIG. 5, filters only the serving cell control channel candidate(s) matching with its own DCI format among the serving cell control channel candidates, using DCI format information of the terminal, which is extracted from the CRC checker 503, and provides the result value to the second serving cell control channel decoder 507.

The second serving cell control channel decoder 507 decodes the filtered serving cell control channel candidate and provides the decoding results to the interference control channel determiner 511. The interference control channel determiner 511 determines whether the control channel is valid as an interference signal, using the reliability information of the filtered and decoded serving cell control channel.

Figure 9:
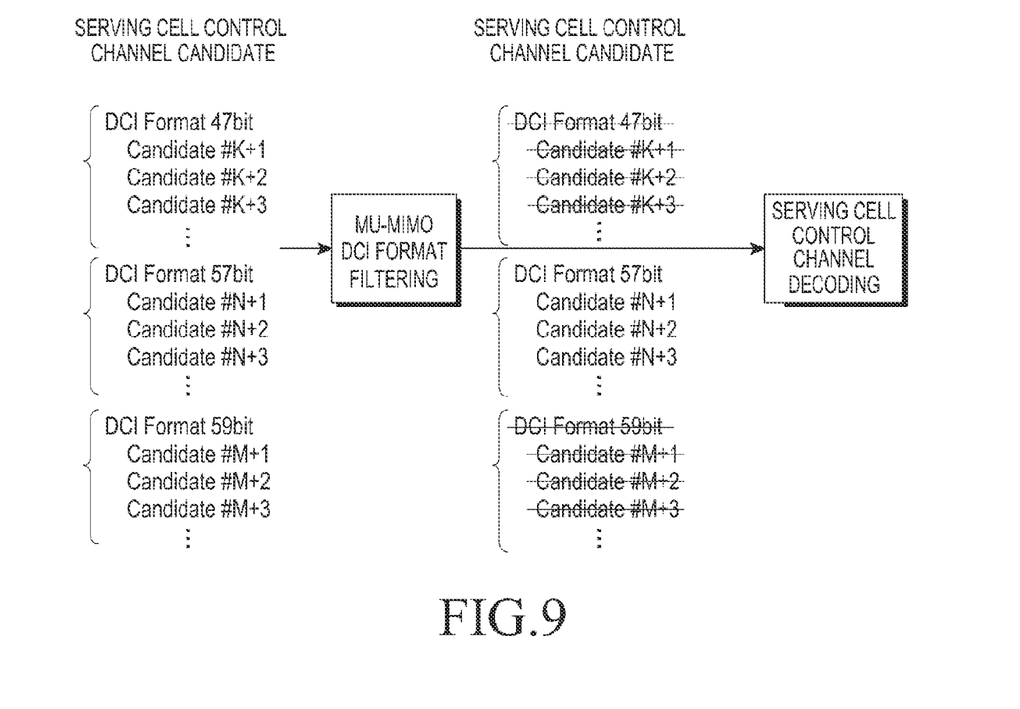
FIG. 9 illustrates an example of Multiuser Multiple Input Multiple Output (MU-MIMO) Downlink Control Information (DCI) format filtering according to an embodiment of the present disclosure.

FIG. 9 illustrates an example of MU-MIMO DCI format filtering according to an embodiment of the present disclosure.

Referring to FIG. 9, control channels transmitted to terminals in a same serving cell may have a 47-bit DCI format, a 57-bit DCI format, and a 59-bit DCI format. If a terminal knows that its own DCI format is a 57-bit DCI format, from its UE-ID, then the terminal may decode only the control channels having the same DCI format as its own DCI format, without decoding all the control channels, when performing blind decoding to obtain interference signal information of another terminal in the same serving cell, efficiently reducing the number of decoding operations.

In addition, the MU-MIMO DCI format filtering may be applied together with the above-described persistent UE-ID filtering.

Referring again to FIG. 5, when the terminal operates in the MU-MIMO transmission mode, if filtering is performed in the MU-MIMO DCI format filter 505 and decoding on the control channel candidates of the serving cell is performed in the second serving cell control channel decoder 507, and then the decoded data is provided to the persistent UE-ID filter 513, the persistent UE-ID filter 513 may estimate a UE-ID for the control channel candidates of the serving cell, which are filtered in the MU-MIMO DCI format, in accordance with the method described in FIG. 7. The persistent UE-ID filter 513 then provides the estimation results to the interference control channel determiner 511. The interference control channel determiner 511 determines whether the control channel is valid as an interference signal, using the reliability information of the data decoded from the control channel candidates of the serving cell, which have the UE-ID.

Figure 10:
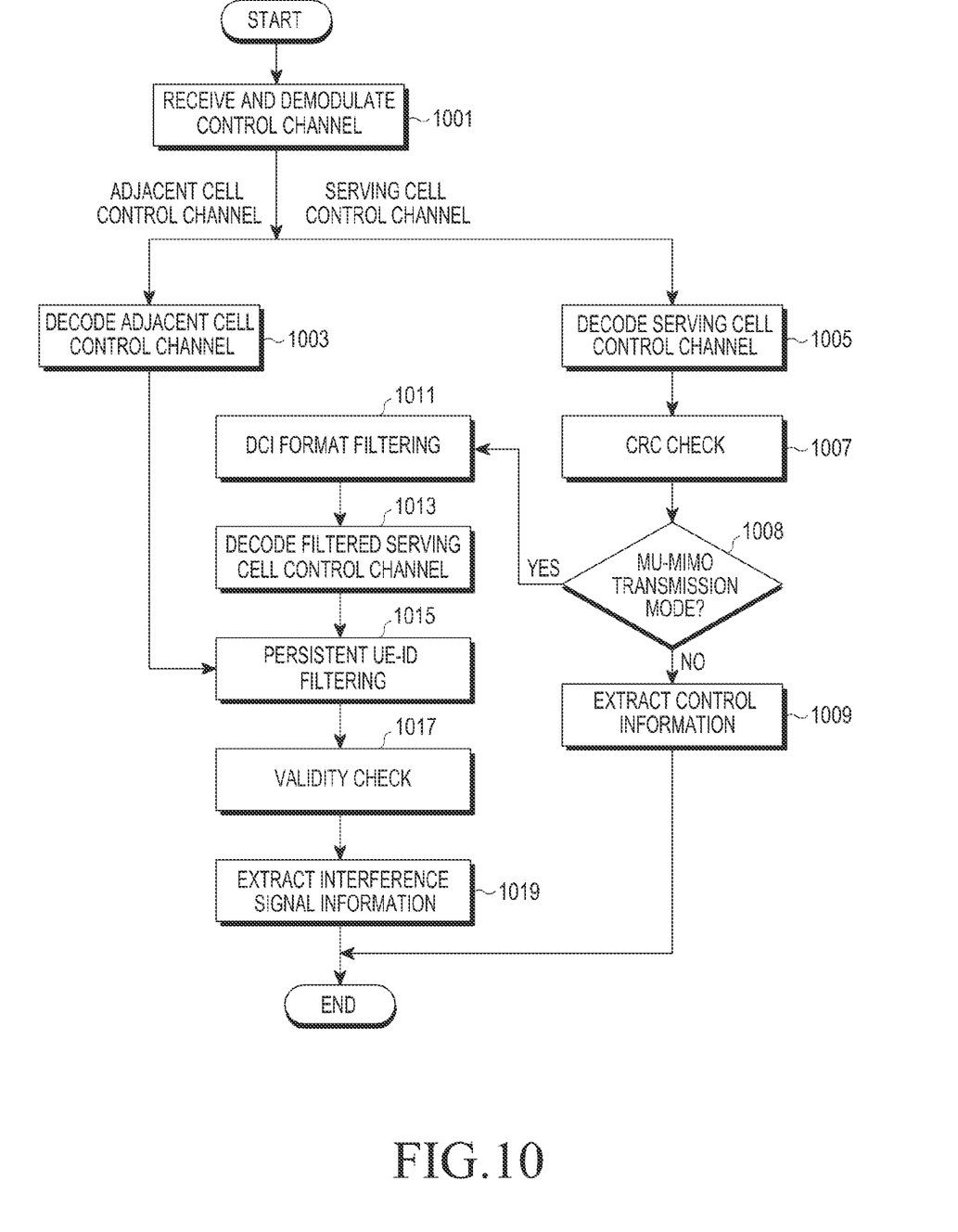
FIG. 10 is a flowchart illustrating a process of determining an interference signal according to an embodiment of the present disclosure.

FIG. 10 is a flowchart illustrating a process of determining an interference signal according to an embodiment of the present disclosure.

Although FIG. 10 illustrates a process in which both the DCI format filtering and the persistent UE-ID filtering, according to embodiments of the present disclosure, are both applied, the two filtering methods may be applied separately. However, the DCI format filtering is used in the MU-MIMO transmission mode.

Referring to FIG. 10, a terminal receives and demodulates control channels of a serving cell and an adjacent cell in step 1001, and decodes the control channel of the adjacent cell and the control channel of the serving cell in steps 1003 and 1005, respectively.

In step 1007, the terminal performs a CRC check. Specifically, the terminal calculates a CRC using information bits of the decoded serving cell control channel, and determines if a value obtained by performing the XOR operation on the decoded tail bits and the calculated CRC is equal to its UE-ID received from the base station.

In step 1008, the terminal determines a transmission mode. If the transmission mode is not the MU-MIMO transmission mode and if the value obtained by performing the XOR operation on the decoded tail bits and the calculated CRC is equal to its UE-ID received from the base station, the terminal extracts the UE-ID and the DCI format as control information in step 1009.

If the terminal operations in the MU-MIMO transmission mode, in step 1011, the terminal filters only the serving cell control channels having a same DCI format, using the DCI format extracted in step 1007, and decodes the filtered serving cell control channels in step 1013.

In step 1015, the terminal filters the UE-IDs for the serving cell control channels and for the adjacent cell control channels using a persistent UE-ID filtering method, e.g., according to the above-described embodiment of the present disclosure.

In step 1017, the terminal determines whether the control channels are valid as an interference signal, using the reliability information of the data decoded from the serving cell and adjacent cell control channels having the filtered UE-ID. In step 1019, the terminal outputs the valid channels as interference signal information.

According to the above-described embodiments of the present disclosure, a terminal may increase the accuracy when obtaining control channel information about an interference signal, thereby improving the interference signal cancellation and data reception performances.

With the use of the persistent UE-ID filtering method according to an embodiment of the present disclosure, a terminal may directly extract interference signal information without the base station providing information about the interference signal to the terminal, saving resources of the control channels.

Further, with the use of the persistent UE-ID filtering method according to an embodiment of the present disclosure, even though a base station in a single cell transmits data to multiple terminals at the same time using MU-MIMO, a terminal may extract interference signal information as in the case of inter-cell interference, efficiently processing the interference between signals of the terminal. By applying the MU-MIMO DCI format filtering technique according to an embodiment of the present disclosure together with the persistent UE-ID filtering method in the MU-MIMO environment, it is possible to extract the information more accurately.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for extracting interference signal information by a terminal in a communication system, the method comprising:
    demodulating control channel signals received from a serving cell and an adjacent cell;
    decoding the control channel signals received from the serving cell to extract control information;
    decoding the control channel signals received from the adjacent cell;
    extracting, at each subframe, from the decoded control channel signals received from the adjacent cell, a terminal Identifier (ID) of the adjacent cell;
    accumulating the extracted terminal IDs;
    filtering only a control channel signal from among the control channel signals received from the adjacent cell corresponding to a terminal ID having an accumulation count that is greater than or equal to a threshold, from among the accumulated extracted terminal IDs;
    determining a reliability value of the filtered control channel signal;
    identifying the filtered control channel signal as a first interference signal, if the reliability value is greater than or equal to a first predetermined value; and
    extracting interference signal information based on the first interference signal.

2. The method of claim 1, wherein extracting the terminal ID comprises:
   extracting information bits and tail bits from the decoded control channel signals received from the adjacent cell;
   calculating a Cyclic Redundancy Check (CRC) from the information bits; and
   extracting the terminal ID by performing an Exclusive OR (XOR) operation on the calculated CRC and the tail bits.

3. The method of claim 1, further comprising:
   if the terminal operates in a Multiuser Multiple Input Multiple Output (MU-MIMO) transmission mode, extracting interference signal information from a set of control channel signals having a same Downlink Control Information (DCI) format as a DCI format of control information extracted from the control channel signals of the serving cell.

4. The method of claim 3, wherein extracting the interference signal information from the control channel signal of the serving cell comprises:
   filtering a control channel signal having the same DCI format as the DCI format of the extracted control information, among the control channel signals of the serving cell;
   decoding the filtered control channel signal of the serving cell;
   determining a reliability value of the decoded filtered control channel signal of the serving cell;
   identifying the decoded filtered control channel signal as a second interference signal, if the reliability value is greater than or equal to a second predetermined value; and
   extracting the interference signal information based on the second interference signal.

5. The method of claim 4, wherein identifying the decoded filtered control channel signal as a second interference signal comprises:
   extracting and distinguishing information bits and tail bits;
   calculating a CRC from the information bits, and extracting the terminal ID by performing an XOR operation on the calculated CRC and the tail bits;
   extracting and accumulating the terminal ID during the predetermined subframe; and
   filtering only a control channel signal corresponding to a terminal ID, an accumulation count of which is greater than or equal to a threshold, in a set of the accumulated terminal IDs.

6. An apparatus for extracting interference signal information in a communication system, the apparatus comprising:
   a receiver configured to demodulate control channel signals received from a serving cell and control channel signals received from an adjacent cell; and
   a control channel decoder configured to:
      decode the control channel signals received from the serving cell to extract control information;
      decode the control channel signals received from the adjacent cell;
      extract, at each subframe, from the decoded control channel signals received from the adjacent cell, a terminal Identifier (ID) of the adjacent cell;
      accumulate the extracted terminal IDs;
      filter only a control channel signal from among the control channel signals received from the adjacent cell corresponding to a terminal ID having an accumulation count that is greater than or equal to a threshold, from among the accumulated extracted terminal IDs;
      determine a reliability value of the filtered control channel signal;
      identify the filtered control channel signal as a first interference signal, if the reliability value is greater than or equal to a first predetermined value; and
      extract interference signal information based on the first interference signal.

7. The apparatus of claim 6, wherein the control channel decoder comprises:
   an adjacent cell control channel decoding unit configured to decode the control channel signals received from the adjacent cell to extract information bits and tail bits; and
   a terminal ID filtering unit configured to:
      calculate a Cyclic Redundancy Check (CRC) from the information bits;
      extract the terminal ID by performing an Exclusive OR (XOR) operation on the calculated CRC and the tail bits;
      extract and accumulate the terminal ID during the predetermined subframe; and
      filter only the control channel signal corresponding to the terminal ID having the accumulation count of that is greater than or equal to the threshold.

8. The apparatus of claim 6, wherein if the terminal operates in a Multiuser Multiple Input Multiple Output (MU-MIMO) transmission mode, the control channel decoder is further configured to extract interference signal information from a control channel signal having a same Downlink Control Information (DCI) format as a DCI format of control information extracted from the control channel signals of the serving cell.

9. The apparatus of claim 8, wherein the control channel decoder comprises:
   a DCI format filtering unit configured to filter the control channel signal having the same DCI format as the DCI format of the extracted control information, among the control channel signals of the serving cell;
   a serving cell control channel decoding unit configured to decode the filtered control channel signal of the serving cell; and
   an interference control channel determining unit configured to:
      determine a reliability value of the decoded filtered control channel signal of the serving cell;
      identify the decoded filtered control channel signal as a second interference signal, if the reliability value is greater than or equal to a second predetermined value; and
      extract the interference signal information based on the second interference signal.

10. The apparatus of claim 9, wherein the serving cell control channel decoding unit extracts information bits and tail bits; and
   wherein the control channel decoder further includes a terminal ID filtering unit configured to:
      calculate a CRC from the information bits, and extract the terminal ID by performing an XOR operation on the calculated CRC and the tail bits;
      extract and accumulate the terminal ID during the predetermined subframe; and
      filter only a control channel signal corresponding to a terminal ID, an accumulation count of which is greater than or equal to a threshold, among the accumulated terminal IDs.

* * * * *